United States Patent [19]

Booker et al.

[11] Patent Number: 5,276,433
[45] Date of Patent: Jan. 4, 1994

[54] METHODS AND APPARATUS FOR TEMPERATURE SENSING

[75] Inventors: Martin W. Booker, Taunton; David L. Melton, 18 Winston Avenue, Ipswich, Suffolk IP4 3LS, both of England

[73] Assignees: Brissco Equipment Limited, Bristol; David L. Melton, Ipswich, both of England

[21] Appl. No.: 867,743

[22] Filed: Apr. 13, 1992

[30] Foreign Application Priority Data

| Apr. 11, 1991 [GB] | United Kingdom | 9107702 |
| Sep. 12, 1991 [GB] | United Kingdom | 9119457 |
| Nov. 13, 1991 [GB] | United Kingdom | 9124131 |
| Dec. 10, 1991 [GB] | United Kingdom | 9126164 |

[51] Int. Cl.⁵ ............................................. G08B 17/04
[52] U.S. Cl. ............................ 340/591; 116/106; 169/DIG. 3, 38, 56, 54; 116/103, 106; 337/320, 332, 306, 409, 401
[58] Field of Search ............. 340/591; 169/48, 23, 169/DIG.; 116/103, 106; 337/320, 332, 306, 409, 401

[56] References Cited

U.S. PATENT DOCUMENTS

| 2,798,452 | 7/1957 | Baer | 116/106 |
| 2,971,132 | 2/1961 | Putney | 340/591 |
| 3,014,206 | 12/1961 | St. Clair Slavin | 340/591 |
| 3,760,393 | 9/1973 | Lindberg | 337/320 |
| 3,961,328 | 6/1976 | Hornbostel, Jr. | 340/592 |
| 4,023,164 | 5/1977 | Delaney | 340/418 |
| 4,055,844 | 10/1977 | Hornbostel, Jr. | 340/591 |
| 4,381,439 | 4/1983 | Miyazawa et al. | 219/10.55 B |
| 4,728,940 | 3/1988 | Stoll et al. | 340/591 |
| 4,819,250 | 4/1989 | Thevenon | 374/104 |

FOREIGN PATENT DOCUMENTS

| 2364202 | 2/1975 | Fed. Rep. of Germany . |
| 216436 | 6/1992 | Fed. Rep. of Germany . |
| 1281008 | 11/1961 | France | 340/591 |
| 1234977 | 6/1971 | United Kingdom . |
| 2001464 | 1/1979 | United Kingdom . |
| 2063536 | 6/1981 | United Kingdom . |
| 2129557 | 5/1984 | United Kingdom . |
| 2144544A | 3/1985 | United Kingdom . |
| 2223097 | 3/1990 | United Kingdom . |

Primary Examiner—Glen R. Swann, III
Attorney, Agent, or Firm—Larson & Taylor

[57] ABSTRACT

A temperature sensor has a flexible nylon tube connected by a fluid-tight coupling to a metal bellows within a metal housing. The interior of the tube and bellows is filled with a pressurized liquid whose critical temperature corresponds to a threshold temperature to be sensed. The pressurized liquid holds the bellows extended, holding an actuating piston back against the action of a spring. When the threshold temperature is reached, the liquid in the tube must boil and ruptures the tube, causing the bellows to collapse and the actuating piston to move. A projecting actuator then mechanically initiates a response such as the closing of a damper in an air-conditioning duct.

32 Claims, 3 Drawing Sheets

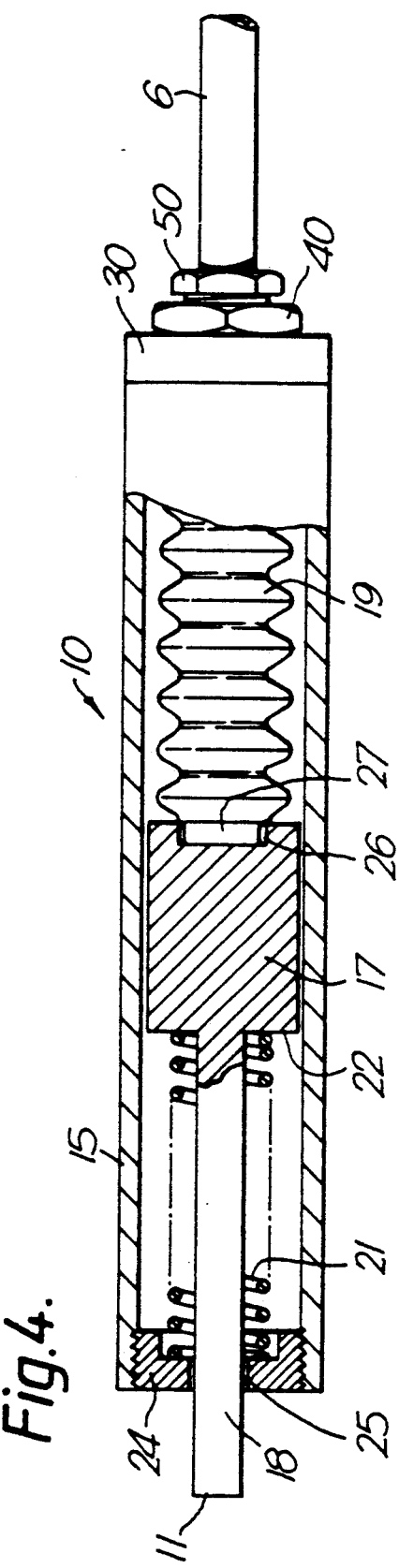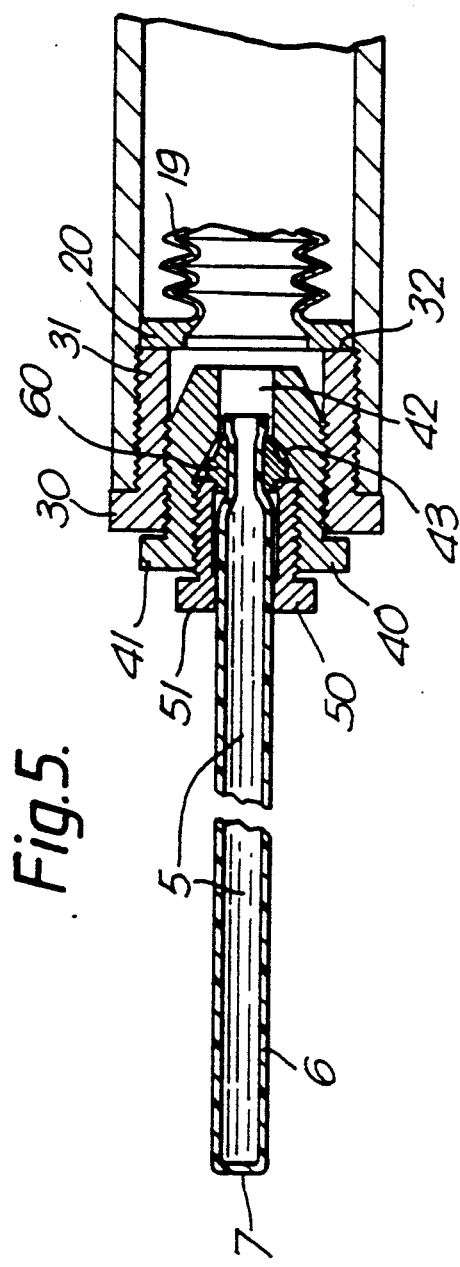

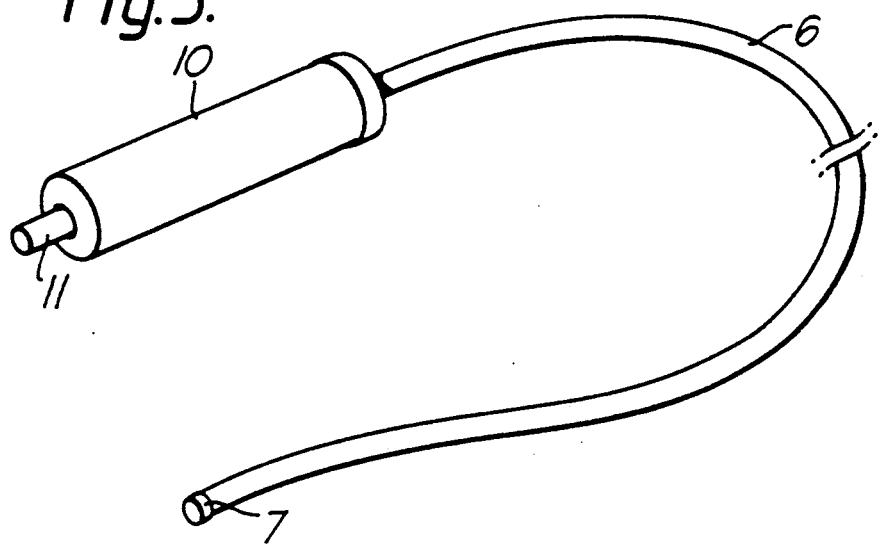
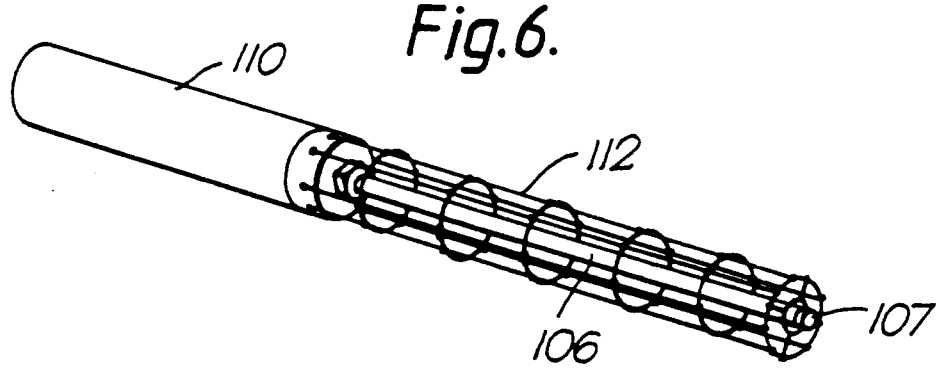
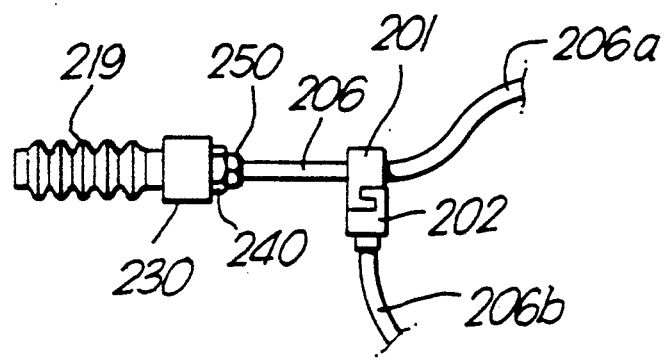

METHODS AND APPARATUS FOR TEMPERATURE SENSING

FIELD OF THE INVENTION

This invention relates to methods and apparatus for temperature sensing.

There exist a number of applications in which it is desirable to monitor temperature in such a way as to detect when a threshold temperature is reached, without necessarily being able to determine the value of the temperature at other times. Detectors for a sprinkler system are one example. Another example is in the emergency control of dampers in service ducts e.g. air-conditioning ducts.

PRIOR ART

Conventionally, such sensors have used small glass bulbs containing a liquid e.g. an alcohol which will tend to boil as temperature rises and burst the bulb, initiating some safety procedure such as closure of a damper, sounding of an alarm, starting of sprinkling etc.

Other known disclosures relating to fire detection (particularly in road tunnels) describe a long metal tube extending along the roof of the tunnel and containing pressurized gas. Expansible elements are connected to the tube ends and these move mechanically when pressure in the tube increases following a rise in temperature. The mechanical movement is used to initiate an alarm.

Problems associated with the prior art systems include difficulty of installation and maintenance. Particularly with the liquid-filled frangible bulbs, there is a serious problem of reliability. Although predicted to burst at a certain temperature, in practice they burst over a wide range of temperatures. In the context of e.g. an air-conditioning duct, this lack of temperature reliability is compounded by the remoteness of the bulb from a large part of the duct cross-section. As a result, there have been cases of fires spreading through ducts even though sensor-actuated dampers were fitted.

SUMMARY OF THE INVENTION

The present invention is concerned with providing novel temperature sensors for determining when a sensed temperature reaches a threshold temperature, novel service duct installations comprising temperature sensors, and methods of operating these.

In one aspect, the invention provides a temperature sensor for determining when a sensed temperature reaches a threshold, comprising a sensor element for exposure at a sensing region and having an enclosure containing a fluid under a pressure whereby the fluid is at least partially liquid, and which can vaporize and burst the enclosure at the threshold temperature, and a pressure-responsive component connected to the enclosure so as to respond to a pressure drop resulting from the bursting thereof, characterised in that the fluid has a critical temperature corresponding substantially to the threshold temperature.

The critical temperature of the liquid is typically from 50° C. to 300° C., more usually below 200° C., still more usually below 150° C. and perhaps below 100° C. in a conventional fire-detection scenario. A value in the range 60° to 80° C. would be usual for fire detection.

In another corresponding aspect, the invention provides a temperature sensor element comprising an enclosure for exposure at a sensing region, having a burstable wall and containing a fluid at least substantially in liquid state, characterised in that the burstable wall can withstand the pressure of the closed fluid up to a threshold value corresponding substantially to a critical temperature of the fluid, but will burst at or near that threshold temperature.

In this way we can obtain an advantage based on the phenomenon of critical temperature. The fluid cannot remain liquid above its critical temperature. If therefore a fluid is selected having a critical temperature corresponding to the desired "triggering" temperature of the sensor, a much more reliable and temperature-consistent response may be obtained, without special design of the enclosure.

The fluid in the enclosure may comprise one or more halogenated hydrocarbons. These are advantageous because of their inert nature, in addition to being available with critical temperatures in the main regions of interest.

The burstable part of the enclosure may have a flexible wall. The enclosure may be an elongate tube. In a preferred embodiment, the enclosure is an elongate flexible plastics tube which can be burst by boiling of the fluid contents. The provision of an elongate flexible tube has the advantage that a single sensor can be effectively operational through a sensing region of substantial size.

Where the flexible tube is used in this context, it may be e.g. 0.5 to 12 meters in length. However even a shorter tubular "probe" sensor may also be useful for some purposes.

The pressure in the enclosure should generally be such as to keep the contents at least partially or substantially liquid at ambient temperature (e.g. room temperature). However it will commonly be a high pressure e.g. at least 10 bars. For the halocarbon liquids mentioned above it may be e.g. 17 bars or over.

A suitable pressure-responsive component comprises an expansible/collapsible element connected to the enclosure. This is held in a relatively expanded state by the pressure of the contained fluid, but moves to a relatively collapsed or contracted state when the enclosure bursts and the fluid escapes. The element desirably has a defined direction of expansion/collapse to make it more useful in an actuating or switching context. One such element is a bellows e.g. a metal bellows.

The contraction of such an element may be sensed by an actuating member urged against it in the contraction direction, so as to respond positively to the contraction. A sprung plunger is suitable. In a convenient embodiment, the expansible/collapsible element is housed together with the relevant part of the actuating member within a housing e.g. a tubular housing, which locates and directs them relative to one another.

The pressure-responsive component may be connected so as to actuate an alarm and/or some hazard-prevention mechanism or system. This actuation may be by means of a mechanical movement of an actuating member as mentioned above. Safety systems with which the concept may be used include dampers for service ducts, sprinkler systems and other possible applications, in particular applications for preventing fire or other heat damage.

In a particularly preferred embodiment, we provide an elongate plastics tube connected by a coupling to a bellows, forming the enclosure as specified above. The tube, bellows and their coupling may form an entirely self-contained unit. Alternatively, it may in some cases be preferred to provide some back-up reservoir of pressurized fluid, connected to them, to ensure that the pressure does not fall through long-term leakage.

In another preferred embodiment, the apparatus provided consists of a housing e.g. a tube, containing the expansible element and an actuator member for urging against it, a part movable with the actuating member projecting from one part of the housing and the tube of the sensor enclosure from another part.

In a corresponding further aspect, the invention provides a method of detecting a rise in temperature to a predetermined threshold level, in which a fluid medium with a critical temperature corresponding substantially to the threshold level, and contained within an enclosure in an at least partially liquefied state, bursts the enclosure as the threshold temperature is reached and causes a pressure-responsive component, in communication with the enclosure, to respond.

We have described above how the use of a long flexible tube gives special advantages over a small bulb in a service duct. In a further independent aspect, therefore, the invention provides a service duct installation comprising a duct damper movable between closed and open conditions;

a sensing element exposed to the duct interior and comprising a rupturable enclosure containing a fluid, and a pressure-responsive component to detect bursting of the enclosure and initiate a consequent closure of the damper, characterised in that the sensing element comprises an elongate flexible plastics tube which extends in the cross-section of the duct e.g. substantially around and/or across the duct.

Details of the plastics tube, fluid contents thereof and pressure-responsive component may preferably be as specified above.

The tube may form a loop.

BRIEF DESCRIPTION OF THE DRAWINGS

Embodiments of the invention are now described by way of example, with reference to the accompanying drawings in which:

FIG. 3 shows a temperature sensor unit with a flexible tube and an actuating mechanism;

FIG. 4 is a partial longitudinal section through a tubular housing of the actuating mechanism of the FIG. 3 sensor;

FIG. 5 is a longitudinal axial section through an end of the tubular housing where it joins to the flexible tube;

FIG. 6 shows another embodiment of sensor with a surround for the sensor element, and FIG. 7 shows a further embodiment of a sensor product.

DETAILED DESCRIPTION OF THE PREFERRED EMBODIMENTS

Figure 1:
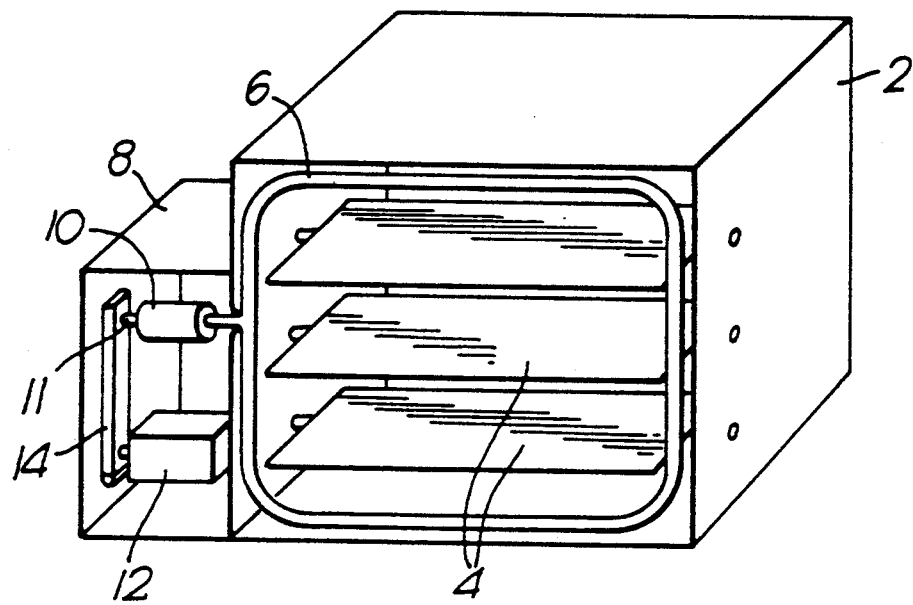
FIG. 1 is a perspective view of a damper for an air-conditioning duct, incorporating a temperature sensor.
Figure 2:
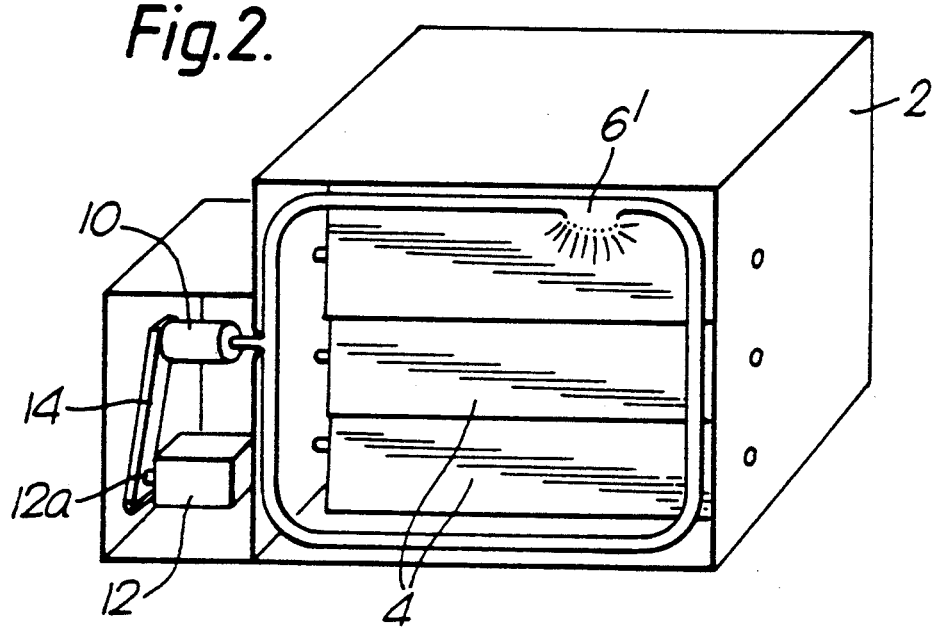
FIG. 2 is a similar view of the damper showing the sensor operating and actuating the damper mechanism.

FIG. 1 shows a damper installation for an air-conditioning duct. The damper has a generally conventional construction, with a duct housing 2 incorporating a set of pivotable damper vanes 4—three, in this case—which can pivot between an open condition (FIG. 1) and a closed condition (FIG. 2). In the closed condition, the vanes 4 substantially close off the duct. Such dampers are known; in addition to enabling the control of the air conditioning they are also intended to help prevent the spread of fire through air-conditioning ducts. The short section shown may be part of a complex ducting system which can extend over a considerable length and may include a number of such dampers. Air-conditioning is a particular example; such dampers may be applied (particularly for prevention of spread of fire) in other types of service duct or conduit e.g. on an oil rig.

A control and drive box 12 is connected to drive the vanes 4 in a controllable way between the open and closed conditions. It is indicated here only schematically: typically it might include a pneumatic drive. Its control function involves a projecting switch probe 12a which is actuable by a switch actuator, shown in this version as a lever 14. In the outward condition of the lever 14 shown in FIG. 1, the vanes 4 are held open. When the top of the lever 14 moves inward (FIG. 2) the switch probe 12a detects this and the drive 12 moves the vanes 4 to the closed condition.

We are particularly concerned with means for initiating this closure in the event of a heat hazard, particularly fire. FIG. 1 shows an elongate tube 6 which extends around the duct 2 at a position near the vanes 4, forming a loop which is a sensing element, connected to a responsive element 10 which includes an actuator element 11 in the form of a projecting movable pin projecting from its end and contacting the top of the lever 14. The responsive element 10, lever 14 and control/drive 12 are housed in a control housing 8 adjacent the duct 2, in a manner which is in itself conventional.

The sensor element tube 6 is adapted to rupture when subjected to heat exceeding a certain predetermined temperature corresponding to a hazard. Its fluid contents are under pressure so that when, in the event of excessive heat, a rupture 6' occurs (FIG. 2), there is a fall in pressure in the tube 6. The responsive element is adapted to respond to this fall in pressure by mechanically moving the actuating part 11, in this case inwardly so that the lever 14 moves and causes the vanes 4 to close as described previously.

The tube 6 is preferably a flexible plastics tube so that it can be adapted to follow the internal shape of the duct 2, or to follow some other shape e.g. a convoluted path, within the duct space. It need not be a closed loop; it may have a free end.

Because the elongate sensing element 6 extends over a substantial part of the internal extent of the duct 2, it is considerably more effective in detecting high temperatures than the previous frangible phials which scarcely projected through the duct wall and would burst only when that location became hot, perhaps too late to prevent the spread of fire via remoter parts of the damper.

Usually the tube will be arranged at or near the damper, but it may be preferable to arrange it at some distance away, or to have sensing elements spaced on both sides of the damper.

The control 12 may be connected to corresponding controls of other dampers in the system, so that when an excess temperature is detected at one position all the dampers may be operated together.

A specific construction of a heat sensor, usable in the previously-described embodiment, is now described with reference to FIGS. 3, 4 and 5. It comprises an elongate flexible thermoplastics tube 6, closed at one end 7 and with the other end connected into a pressure-responsive unit 10. The unit 10 has a tubular housing 15 containing a bellows 19 which makes sealed communication with the other end of the tube 6 at one end of the tubular housing 15. The bellows 19 and tube 6 therefore form together a sealed enclosure.

Also inside the tube 15 is an actuating element consisting of a piston 17 which bears on the free end of the bellows 19, and a shaft 18 extending integrally from the piston axially along the housing 15 and out through a hole 25 at the opposite end form the tube 6. A free end 11 of the shaft 18 projects out through the hole 25, which is formed in a threaded end-plug 24. A spring 21 is in compression between the inside of the end-plug 24 and an opposing surface 22 of the piston part 17, so that the actuating element tends to be urged to the right as seen in FIG. 4, towards the other end of the housing 15. The closed end of the bellows 19 as a cylindrical protrusion 27 which seats in a corresponding central recess 26 at the end of the piston 17. The open end of the bellows 19 has a thick flange 20 which is welded against the flat end surface 32 of a cylindrical metal bushing 31, screw-threaded into that end of the housing 15 from which the tube 6 emerges. The resiliently urged piston 17 therefore tends to compress the bellows 19.

The sealed connection of the open end of the tube 6 to the bellows 19 is shown in FIG. 5. It is in fact a compression-type pipe-coupling which is generally known for such uses, commercially known as an "Enoch" coupling. The open end of the tube 6 is squeezed through an undersize collet ring 60 which grips it firmly. An inner threaded bushing 41, having a head formed as a nut 40, is screw threaded into an internal thread of the outer bushing 31. The inner bushing 41 has a central bore 42 communicating through to the entrance to the bellows 19, which bore 42 has a conical portion 43 tapering towards the bellows from the outside. It also has an internal screw thread at its outer nut end. The free tube end with the collet 60 is pushed into this inner bushing 41. The collet 60 wedges against the tapering portion 43 with its own conically-tapered surface. A clamping bushing 51, threaded over the tube 6 and having an outer screw thread which can screw into that of the bore 42 of the inner bushing 41, is then screwed into that bushing. Its inner end abuts against the collet 60 and forces it into tight contact with the tapering surface 43 so that the end of the tube 6 is both gripped tightly and held in place.

The tub 6 is made of nylon-6. Other plastics, particularly thermoplastics may be used, provided that they are able to withstand a substantial internal pressure. This can be achieved without difficulty by selecting a suitable wall thickness. In general, the choice of tubing in this embodiment is a simple one because, as described below, its exact properties are not critical to effective operation.

The length of tubing will, particularly for a flexible tubing, generally be between 0.5 and 12 meters, more commonly 0.1 to 4 meters. The wall thickness may be e.g. 0.2 to 2 mm, more particularly 0.5 to 1 mm. The bore may be e.g. 1 to 10 mm, more usually 2 to 6 mm. The closed end 7 may be sealed by any method providing a pressure-tight seal. For example, a compressive heat-sealing method is suitable. Alternatively, a separate end fitting which clamps the open end of the tube and forms a dead end may be used.

The bellows 19 is generally cylindrical. It is a highly flexible construction made of thin metal e.g. stainless steel or phosphor bronze. Such bellows are commercially available. It is closed at one end only. The skilled man will be able to select an appropriate element, taking into account the chosen pressure in the system and the size of the other components, without difficulty. We used a bellows about 14 mm in outer diameter, with twenty eight convolutions, a wall thickness of 0.13 mm and able to withstand an internal pressure up to 4,800 kPa (700 psi).

The nylon tube 6 shown is a simple, single length closed at one end. It will be understood that this is just one possible conformation. It is possible also to have the tube branched so that it can reach locations in several different directions, and/or looped so that it joins back up with itself either in a communicating or a non-communicating fashion.

The sealed interior space defined by the bellows 19 and tube 6 is filled with a fluid which will burst out of the tube when temperature exceeds some critical value. In this embodiment for a fire detector in a service duct, bursting at 67° to 70° C. is the preferred aim. In the embodiment we use a liquid which is largely bromotrifluoromethane, available as "BTM Halon 1301". At normal pressures this substance has a boiling point of −57.8° C. Its critical temperature however is +67° C. To take advantage of this critical temperature, the entire system is pressurised to keep the halocarbon primarily in the liquid state. Specifically, we pressurise the enclosure to about 22 bar so as to sustain a substantial liquefaction of the contents.

In other embodiments, a different critical temperature may be desired. It is possible to adjust the critical temperature by using a mixture of suitable substances, for example, a mixture of halocarbons. A mixture of bromotrifluoromethane with bromochlorodifluoromethane (available as "BCF Halon 1211", and having a critical temperature of 153° C.) enables a selected temperature between 67° and 153° C. to be obtained.

We find that the "Enoch" (trade mark) pipe connector described and the welded connection of the bellows can seal sufficiently to contain the contents under the necessary pressure for an extended period of time, so that no pressurised back-up supply is needed. In some circumstances it may however be preferred to provide a pressurised fluid reservoir connected into the sensor system e.g. with a bias valve that will bleed further pressurised liquid into the system at a slow rate if the pressure therein falls below a certain value.

The operation of the sensor is as follows. As mentioned above, in the pressurised system the high internal pressure holds the bellows 19 extended and the end 11 of the actuating shaft 18 projects out from the tubular housing 15. When e.g. in the event of a fire, the pressure of any part of the sensor tube 6 rises above the critical temperature (e.g. 67° C.) then the tube contents at that portion of the tube must boil. Liquid state cannot be maintained above the critical temperature. Because the boiling is irresistible, it immediately ruptures the plastics tube 6 allowing the contents to escape through the rupture. The halocarbons mentioned are substantially inert and do not contribute to a fire hazard. With the drop in pressure, the bellows 19 collapses, the spring 21 can push the piston 17 along the housing and the projecting shaft end 11 retracts. This movement is used to switch the desired mechanism and/or alarm, e.g. by interaction with a lever 14 as shown in FIGS. 1 and 2.

FIG. 6 shows another embodiment which is also suitable for use e.g. in a service duct. The pressure responsive unit 110 is substantially as in the previous embodiment. However the sensor element tube 106 is short: perhaps 10 to 60 cm long. It is connected to the pressure responsive unit 110 as in the previous embodiment. A protective surround in the form of a cage 112 encloses the tube 106. The cage extends substantially the entire length of the tube, being fixed to the housing of the pressure responsive unit 110 at one end and locating the free end 107 of the sensor tube 106 at the other. In this embodiment, the cage is a generally cylindrical wire lattice construction. It holds the tube 106 straight, and also helps protect it from mechanical damage.

This embodiment can be installed e.g. in a service duct as shown in FIG. 1, in place of the existing sensor. The caged tube 106 is positioned to extend out into the duct space, clear of the space swept by the vanes 4. This construction is particularly well adapted to detect heat occurring at or near the centre of the duct. It is possible to install even when there is no access possible to the duct itself, but only to the pre-existing damper control housing 8. It will be noted that flexibility of the tube 106 is not necessary in this embodiment.

FIG. 7 shows a further embodiment. In this embodiment, the sensor construction comprises essentially only the pressure-responsive bellows 219 connected, by means of a pipe-coupling 230, 240, 250, to a long flexible plastics tube 206. Such a sensor element is useful in itself, and may be substituted into existing systems. For example, a conventional damper sensor for a duct has a fluid-filled frangible phial held at the end of a cylindrical metal housing which projects out to the duct space. A sprung actuating plunger acts on the frangible phial to detect breakage thereof. It is a simple matter to replace the phial with an appropriately-sized bellows of the embodiment shown, and fix the coupling 230, 240, 250 into the end of the cylindrical housing e.g. by screwing. In this way, the advantages of an elongate flexible tube, and of the use of a liquid with the selected critical temperature, can be added into a pre-existing system with a minimum of labour.

FIG. 7 illustrates an embodiment in which the long nylon tube 206 is formed into a loop. However the tube space does not communicate in a loop: the free end 206b of the tube is sealed off at a clip portion 202 which can mate with another clip portion 201 attached to the standing part 206a of the tube. This gives more flexibility in the positioning of the tube loop.

What is claimed is:

1. A temperature sensor for determining when a sensed temperature reaches a threshold temperature, comprising
   a sensor element for exposure at a sensing location, said sensor element defining a burstable enclosure;
   a fluid contained in said burstable enclosure at a pressure so as to be at least substantially in liquid state, said fluid having a critical temperature corresponding to the threshold temperature of the sensor, and which thereby bursts the enclosure when the threshold temperature is reached, and
   a pressure-responsive component connected to the enclosure, for indicating a drop in pressure due to the bursting thereof.

2. A temperature sensor as claimed in claim 1 in which the critical temperature of said fluid is from 50° C. to 300° C.

3. A temperature sensor as claimed in claim 1 in which the critical temperature of said fluid is from 50° C. to 150° C.

4. A temperature sensor as claimed in claim 1 in which said fluid comprises at least one halogenated hydrocarbon.

5. A temperature sensor as claimed in claim 1, in which the enclosure has a flexible wall.

6. A temperature sensor as claimed in claim 1 in which the enclosure comprises an elongate tube.

7. A temperature sensor as claimed in claim 1 in which the enclosure comprises an elongate flexible plastics tube.

8. A temperature sensor as claimed in claim 7 in which the tube is 0.5 to 12 meters in length.

9. A temperature sensor as claimed in claim 1 in which the pressure of the fluid in the enclosure, at ambient temperature, is at least 10 bars.

10. A temperature sensor as claimed in claim 1 in which the pressure-responsive component comprises an expansible and collapsible element connected to the enclosure, maintained in an expanded state by the contained fluid, and which on bursting of the enclosure collapses in a predetermined direction.

11. A temperature sensor as claimed in claim 10 in which the expansible and collapsible element comprises a bellows.

12. A temperature sensor as claimed in claim 10, in which the pressure-responsive component comprises an actuating member, said actuating member urging the expansible and collapsible element towards its collapsed condition against the fluid pressure.

13. A temperature sensor as claimed in claim 12, comprising a housing in which the actuating member and the expansible and collapsible element are located relative to one another.

14. A temperature sensor as claimed in claim 1 in which the enclosure comprises an elongate tube, and the pressure-responsive component comprises an expansible and collapsible element connected to the elongate tube and extending axially therefrom.

15. A temperature sensor as claimed in claim 1, in which the pressure-responsive component is operatively connected to actuate an alarm.

16. A temperature sensor as claimed in claim 1, in which the pressure-responsive component is operatively connected to actuate a hazard-prevention mechanism.

17. A method of sensing a rise in temperature to a predetermined threshold value, at a sensing location, comprising
   positioning a fluid-filled enclosure at the sensing location, filling said enclosure with a fluid being at least substantially in liquid state and having a critical temperature corresponding to the predetermined threshold value;
   retaining the fluid in the enclosure until the predetermined threshold value is reached;
   bursting the enclosure by vaporising of the liquid at the predetermined threshold value, and
   detecting the consequent drop in pressure in the enclosure.

18. A method as claimed in claim 17 in which the fluid has a critical temperature in the range 50° to 200° C.

19. A method as claimed in claim 17 in which the fluid-filled enclosure comprises an elongate tube.

20. A method as claimed in claim 17 in which the step of detecting the pressure drop comprises sensing the mechanical movement of a collapsible element in communication with the enclosure.

21. A method as claimed in claim 17, further comprising actuating a hazard-prevention system in response to the detected pressure drop.

22. A temperature sensor element for detecting the reaching of a threshold temperature, comprising an enclosure and a fluid contained in the enclosure which can burst the enclosure by vaporising, wherein the improvement comprises employing a fluid selected to have a critical temperature corresponding substantially to the threshold temperature, and the enclosure having walls which withstand the pressure of the contained fluid substantially until said critical temperature is reached.

23. A sensor element as claimed in claim 22 in which said critical temperature is in the range 50° to 200° C.

24. A sensor element as claimed in claim 22, in which the enclosure is an elongate plastics tube.

25. A temperature sensor comprising
an elongate plastics tube for exposure at a sensing location;
an expansible and contractible pressure-responsive element having a response movement direction, and connected to said tube in a fluid-tight manner such that the tube and pressure-responsive element together form an enclosure;
a fluid contained in said enclosure at least substantially in liquid state, and under a pressure to maintain the pressure-responsive component in an expanded condition, said fluid having a critical temperature in the range 50° C. to 200° C. whereat vaporising thereof bursts the tube and the pressure-responsive component contracts in the response direction.

26. A damper installation for a service duct, comprising:
(i) a duct damper; and
means for moving the duct damper in the service duct between open and closed conditions; and
(ii) a temperature sensor for determining when a temperature in the duct reaches a threshold temperature, said temperature sensor comprising
(a) a sensor element comprising a rupturable elongate flexible plastic tube disposed in the cross-section of the service duct, and
(b) a fluid contained in said tube at a pressure so as to be at least substantially in liquid state, said fluid having a critical temperature corresponding to the threshold temperature, and which thereby bursts the tube when the threshold temperature is reached; and
(iii) a pressure-responsive component connected to the tube to detect loss of pressure therein owing to rupture thereof, and which responds to such loss of pressure by actuating said means for moving the duct damper so as to cause the duct damper to move to the closed condition.

27. A damper installation as claimed in claim 26 in which the critical temperature of said fluid is from 50° C. to 150° C.

28. A damper installation as claimed in claim 26 in which said fluid comprises at least one halogenated hydrocarbon.

29. A damper installation as claimed in claim 26 in which the pressure of the fluid in the tube, at ambient temperature, is at least 10 bars.

30. A damper installation as claimed in claim 26 in which the pressure-responsive component comprises an expansible and collapsible element connected to the tube, said expansible and collapsible element being maintained in an expanded state by the fluid, and, in response to bursting of the tube, collapsing in a predetermined direction.

31. A damper installation as claimed in claim 30 in which the expansible and collapsible element comprises a bellows.

32. A damper installation as claimed in claim 30, in which the pressure-responsive component comprises an actuating member urging the expansible and collapsible element towards a collapsed state against the pressure of the fluid.

* * * * *